United States Patent

[11] 3,628,097

| | | |
|---|---|---|
| [72] | Inventor | Herman H. Kobryner<br>Forest Hills, N.Y. |
| [21] | Appl. No. | 879,156 |
| [22] | Filed | Nov. 24, 1969 |
| [45] | Patented | Dec. 14, 1971 |
| [73] | Assignee | Murray Manufacturing Corporation<br>Jericho, N.Y. |

[54] MULTIPLE-POSITION METER SOCKET
16 Claims, 10 Drawing Figs.

[52] U.S. Cl. .................................................. 317/107,
317/106, 317/119, 339/198 M
[51] Int. Cl. .................................................. H02b 9/00
[50] Field of Search .......................................... 174/59; -
317/104–111, 119; 339/31 B, 198 M

[56] References Cited
UNITED STATES PATENTS

| 3,286,133 | 6/1966 | Sturdivan .................. | 317/104 |
| 3,328,647 | 6/1967 | Gryctko ..................... | 317/119 |
| 3,366,845 | 1/1968 | Esler ......................... | 317/106 |
| 3,404,315 | 10/1968 | Jacobs ........................ | 317/119 |
| 3,491,268 | 1/1970 | Christensen ................. | 317/119 |

*Primary Examiner*—Lewis H. Myers
*Assistant Examiner*—Gerald P. Tolin
*Attorney*—Sandoe, Hopgood and Calimafde ABSTRACT: The invention contemplates employment of plural elongated bus bars in laterally spaced parallel relation extending to serve, in common, a plurality of horizontally adjacent meter-mounting zones, where different load circuits have branch connection, via their respective meters, to the bus bar lines. The bus bar assembly is unitarily mounted in an elongated meter box within which all meter-mounting zones are defined between opposed end or live supply wiring zones. The bus bar ends, where live line connections are made, are carried by insulating spacer blocks on the base or floor of the box. At each meter-mounting zone, insulating means straddles or overstands the bus bars and carries both the live jaws and the load jaws for the stab configuration of a standard plug-in meter. Various different employments of the box, in single-phase branching of single-phase and three-phase supply lines, with and without grounded neutral, will be described.

Patented Dec. 14, 1971 3,628,097

INVENTOR.
HERMAN H. KOBRYNER
BY
Sandoe, Hopgood & Calimafde
ATTORNEYS

Patented Dec. 14, 1971  3,628,097

INVENTOR.
HERMAN H. KOBRYNER
BY
Sandoe, Hopgood & Calimafde
ATTORNEYS

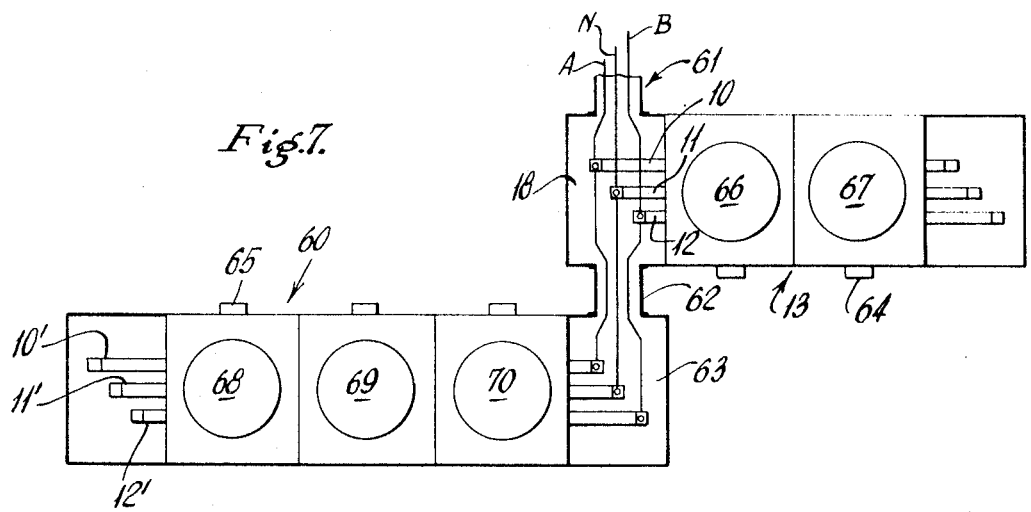
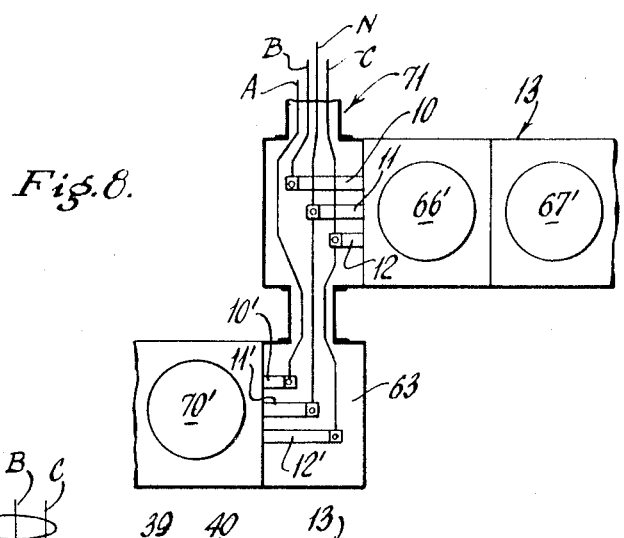
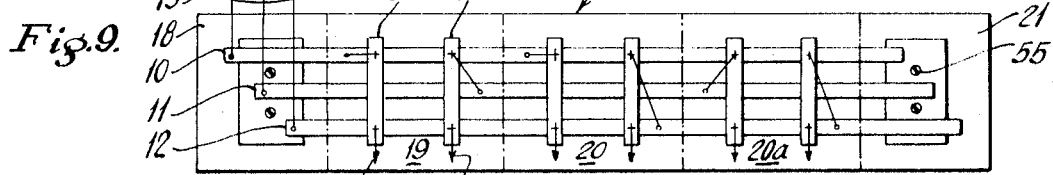
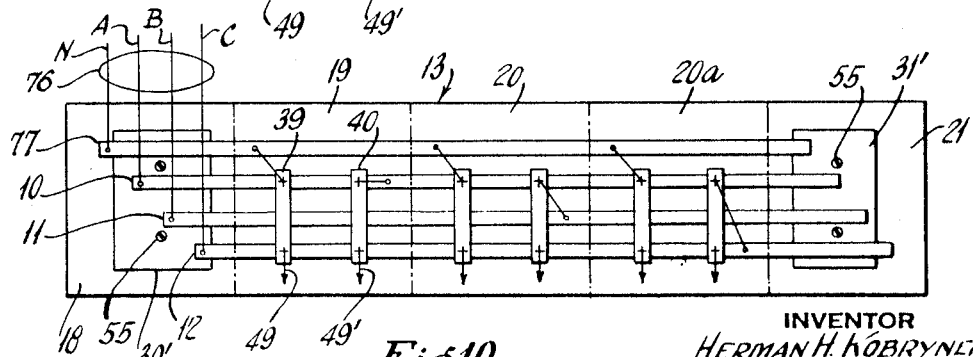

MULTIPLE-POSITION METER SOCKET

This invention relates to internal construction of electric meter boxes, and in particular to such boxes wherein a plurality of horizontally adjacent watt-hour meters of the plug-in type is removably receivable to provide separate monitoring of the power consumption by the respective load circuits served thereby.

In present line-branching boxes of the character indicated, each of the plural meter positions is served by meter-mounting blocks with the usual lugs, grouped and fashioned as if merely providing duplication of a single meter mount. Proposals have been made for bus bar interconnection of meter socket elements at the various meter mount positions, but these structures have been unduly cumbersome and do not lend themselves to ready adaptation to a large variety of installed usage.

It is accordingly an object of the invention to provide an improved multiple-position meter socket box of the character indicated.

A specific object is to achieve a construction of the character indicated wherein a minimum number of parts serves with equal facility a wide variety of specific application requirements.

Another specific object is to meet the foregoing objects with a basic structure which lends itself to accommodating from a single live supply line the maximum number of meter-monitored circuits permitted by current code limitations.

A further specific object is to meet the foregoing objects with a basic structure which is equally able to serve plural single-phase load circuits from a single-phase or from a three-phase live supply line.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Figure 1:
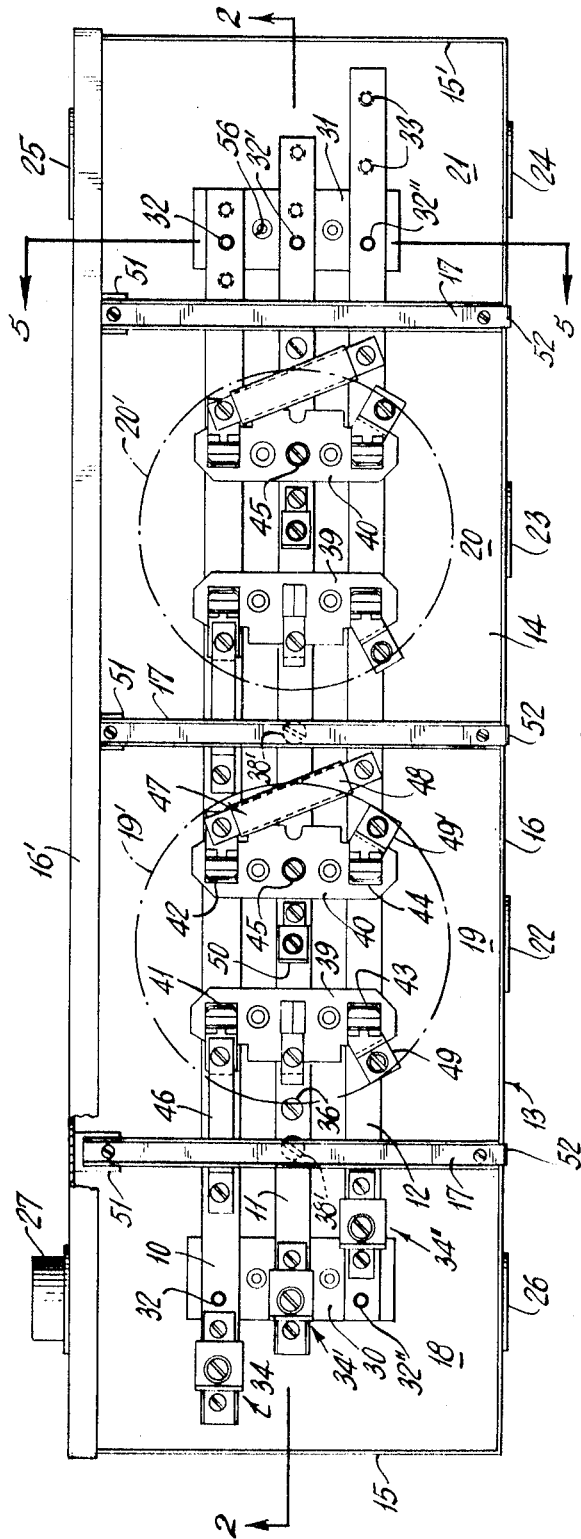
FIG. 1 is a plan view of a multiple-meter box, with covers removed to reveal internal construction of the invention; the parts being connected for a grounded neutral.
Figure 2:
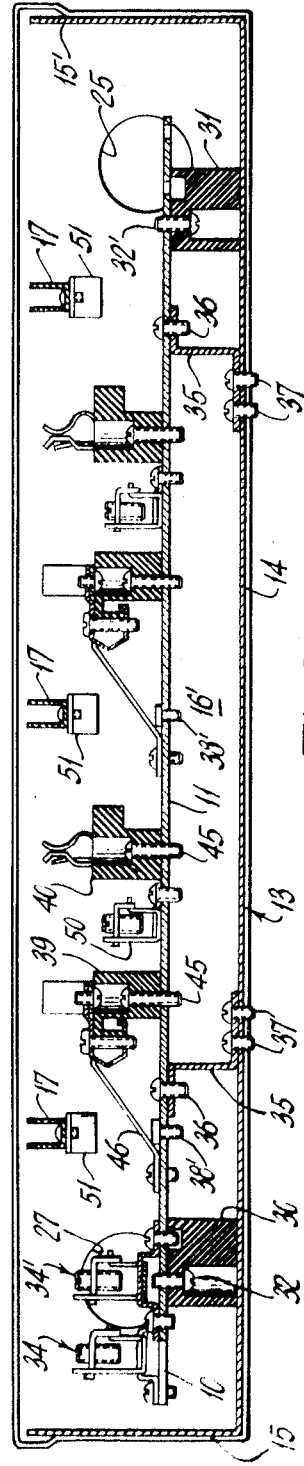
FIG. 2 is a sectional view taken in the plane 2—2 of FIG. 1.
Figure 3:
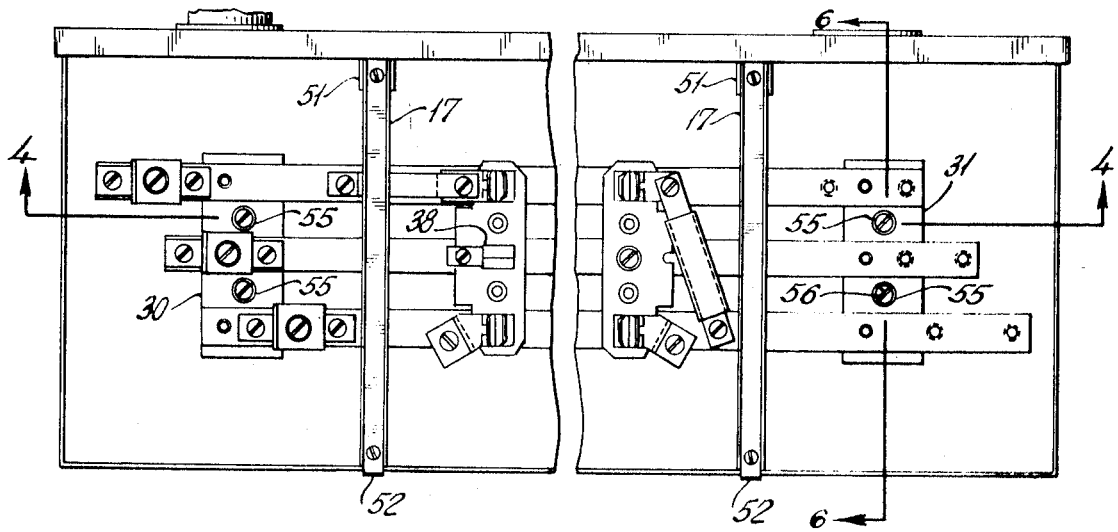
Figure 4:
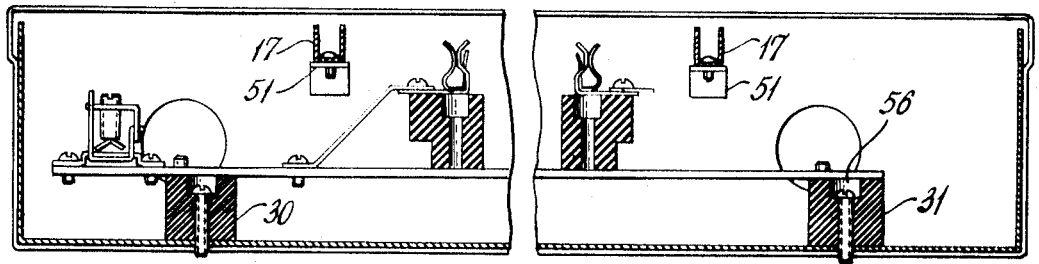
Figures 5, 6:
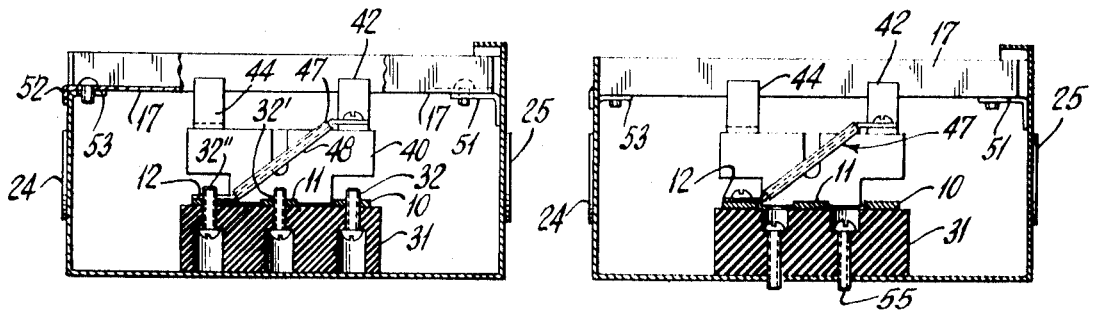

FIGS. 3 and 4 are views similar to FIGS. 1 and 2 and partly broken away, FIG. 4 being taken in the plane 4—4 of FIG. 3, and the parts being connected for an insulated (i.e., ungrounded) neutral;

FIGS. 5 and 6 are similar sectional views, respectively taken in the plane 5—5 of FIG. 1 and in the plane 6—6 of FIG. 3;

FIGS. 7 and 8 are similar simplified plan views of plural boxes of the invention, respectively illustrating single-phase and three-phase adaptability of the invention; and FIGS. 9 and 10 are simplified plan views schematically illustrating different modified arrangements of the invention, for the case of branched single-phase load circuits served from three-phase lines.

Briefly stated, the invention contemplates employment of plural elongated bus bars in laterally spaced parallel relation extending to serve, in common, a plurality of horizontally adjacent meter-mounting zones, where different load circuits have branch connection, via their respective meters, to the bus bar lines. The bus bar assembly is unitarily mounted in an elongated meter box within which all meter-mounting zones are defined between opposed end or live supply wiring zones. The bus bar ends, where live line connections are made, are carried by insulating spacer blocks on the base or floor of the box. At each meter-mounting zone, insulating means straddles or overstands the bus bars and carries both the live jaws and the load jaws for the stab configuration of a standard plug-in meter. Various different employments of the box, in single-phase branching of single-phase and three-phase supply lines, with and without grounded or insulated neutral, will be described.

FIGS. 1, 2 and 5 illustrate a preferred construction of the basic meter box arrangement, for the case in which a three-wire single-phase supply, such as 240 volts with grounded neutral, is branched to plural load lines which are also 240 volts with grounded neutral.

The construction features plural elongated horizontal bus bars 10, 11, 12 contained within a similarly elongated box or housing 13, which may be formed of sheet metal. The box 13, shown with its covers removed, comprises a flat base 14 and upstanding end walls and sidewalls 15–15' and 16–16', respectively. Since box 13 is usually mounted on a vertical building wall or panel, the base 14 will sometimes be called the rear wall of the box. Transverse channels 17, at longitudinally spaced locations, connect the upper edges of the sidewalls 16–16', thereby lending strength of the box and at the same time dividing it into a succession of horizontally arrayed zones or compartments 18–19–20–21. The adjacent central zones 19–20 are of like dimensions and removably accommodate standard plug-in watt-hour meters (not shown, but suggested by phantom outlines 19'–20') for separate monitoring of power consumption into each of two branch lines from the bus bar system. Knockouts 22–23 in wall 16 enable branch line distribution coordinated with the meters 19'–20' which serve them. At the respective ends of the box 13, the compartments 18–21 establish duplicate live supply wiring zones, to which full flexibility of access is provided by vertically aligned knockout openings at 24–25 (in walls 16–16') serving the zone 21, and at 26–27 serving the zone 18; on the assumption that the live supply line is to enter the upper left of box 13, a bushing 27 is shown to have replaced the knockout at that location.

The bus bar system may be fabricated as a subassembly with insulating mounting blocks 30–31 which serve to tie the bars 10–11–12 in fixed relation to each other and which also assure adequate spacing of the bus bars from the rear wall 14. Preferably, the blocks 30–31 are positioned in the end zones 18–21, as shown, and integrity of the subassembly is established by bolts 32–32'–32'' to the ends of the bars 10–11–12. Provision is also made for selection of line connections at one or the other end of the bars, as at the spaced pair of tapped holes 33 for bar 12 in FIG. 1; preferably, such provision is in longitudinally staggered offset relation for connection of live line elements to the respective bus bars. Since the left end has been selected for line connections, separate connectors 34–34'–34'' are shown mounted only at the left ends of bars 10–11–12, resulting in a longitudinally staggered offset relation of these connectors, appropriate to the ready connection of three supply leads (not shown) via bushing 27.

For the application of FIGS. 1, 2 and 5, the central bus bar 11 is neutral and is grounded, and this fact is utilized in securing the bus bar assembly to the rear wall 14. As shown, double brackets 35, at spaced locations between blocks 30–31, rigidly tie the bar 11 to wall 14, at bolts 36–37.

At each of the meter-mounting zones 19–20, insulating block means is mounted to the bus bar assembly, straddling or overstanding all three bars, and conventional spring jaws are thereby positioned for plug-in reception of the live line and load line stabs of a conventional meter. In the form shown, two such blocks 39–40 provide this function for each meter-mounting zone; these blocks are secured by bolts 45 to the central bar 11 and thus form part of the bus bar subassembly. The blocks 39–40 are longitudinally spaced, and each of these blocks 39 (40) carries a live jaw 41 (42) and a load jaw 43 (44). The live jaw 41 on block 39 is directly tied by a conductive strap 46 to one (10) of the live bus bars, and the live jaw 42 on block 40 is directly tied by a conductive strap 47 to the other (12) of the live bus bars; an insulated wrapping or sleeve 48 on strap 47 assures against unwitting or careless short circuiting to strap 47 while the meter is removed from a live bus bar situation.

The branch load connections are made to lug connectors 49–49' associated with the respective load jaws 43–44, for the live elements of the branch, and to a grounded neutral connector 50 mounted on bar 11 between blocks 39–40. The jaw and mounting block arrangement for other meter-mounting zones, as at 20, are as already described for zone 19 and therefore need no further description. The so-called fifth jaw 38 for making connection between the potential coil of a meter and the neutral is carried by block 39; screw 38' on neutral bar 11 serves for making a wire connection (not shown) between neutral and the fifth jaw 38.

To assist in the mounting of the bus bar subassembly in the box, the channels 17 are preferably removably assembled to the upper and lower walls 16'–16. As shown, in the broken-away part of FIG. 1, the upper end of each channel 17 is seated upon and secured to a bracket 51 carried by the box wall. The other end of each channel 17 includes a projection 52 which is bent toward the base 14; this lower end of each channel 17 is seated upon and secured to a bracket or lug 53, at a locally slotted part of the wall 16. Thus inserted, the sides of each channel 17 rigidly abut the upper edges of walls 16–16', thereby positively spacing the same and defining zones, as previously explained. The secured channels 17 positively retain their positions when the meters and the cover panel or panels (not shown) are secured over the open front of the box. It will be understood that by simple removal of the channels 17, the entire volume of the box 13 is directly accessible via the fully open front.

Thus, the bus bar assembly may be fully assembled apart from the box 13. For the grounded neutral arrangement shown, brackets 35 will first have been bolted to the rear wall 14 of the box. Thereupon, the entire described bus bar assembly, including blocks 30–31, bars 10–11–12, the jaw assemblies, and the line and load connectors, is merely bolted in place, at 36.

FIGS. 3, 4 and 6 illustrate application of the same basic bus bar subassembly to the same box 13, for the situation in which the third bar 11 is insulated from ground, as in the case of an insulated neutral supply. In this event, the grounding brackets (35) are dispensed with, and the subassembly is secured to the base or rear wall 14 by means of bolts 55, received in counterbores 56 in blocks 30–31, and driven into tapped openings in the real wall 14. The parts are otherwise as has already been described.

FIGS. 7 to 10 illustrate further employments of the basic meter socket structure already described.

FIG. 7 illustrates that by manufacturing only two standard box sizes, such as the two-meter box 13 (already described) and a three-meter box 60, it is possible, with a maximum of two boxes, to accommodate up to the maximum number of branch lines currently permitted in one enclosure for a given supply line 61; Underwriters Laboratories currently permit up to six such branch lines, and a five-branch system is shown. The difference between box 60 and box 13 is the added length to cover the third meter-mounting zone; all end zones are the same. Thus, a short nipple or bushing 62 at adjacent knockouts for the end zones 18 (of box 13) and 63 (of box 60) establishes vertical live supply alignment. For the form shown, the supply 61 comprises a neutral N and live conductors A–B. The neutral aligns with connectors for the central bus 11 of box 13 and for the central bus 11' of box 60, and the lines A–B have similarly aligned connection to the upper and lower live bus bars 10–10' and 12–12', respectively, of the two boxes. Separate load outlet bushings, as at 64 beneath box 13 and at 65 on the top wall of box 60, accommodate each of the five different branch lines served at meter positions 66–67–68–69–70; these branch line alignments are cleanly spaced from each other and from the live line 61 regardless of whether branch lines leave upwardly or downwardly from their metered positions.

FIG. 8 illustrates a similar arrangement B boxes 13–60, interconnected at 62, except that box 13 is electrically connected to provide separate single-phase branch lines at meter positions 66'–67', based on one phase of a grounded three-phase supply line 71, while the box 60 provides separate single-phase branch lines at other meter positions (such as position 70'), based on another phase of the line 71. The supply 71 is designated with live lines A–B–C and with a grounded neutral N. The neutral N has aligned connections to the central bus bars 11–11'', the live line C has aligned connections with the lower bus bars 12–12', but the remaining live lines A and B are separately connected to bus bars 10' and 10, respectively. Thus, box 13 provides branch circuits from the B–C phase of the supply, and box 60 provides branch circuits from the A–C phase of the supply. It will be understood that in similar fashion, a third meter socket box (not shown) could be aligned, say, beneath box 60 and with its right-end live supply wiring zone beneath the zone 63, for analogous and further metered branching from the third phase A–B of line 71.

FIG. 9 illustrates use of the box 13 in an ungrounded three-phase multiple-meter branch circuit arrangement, fed by the three live lines A–B–C of supply 75, entering the end zone 18. The live lines A–B–C are respectively connected to the bus bars 10–11–12, but the meter-mounting jaws have different connections to the bus bars at the various meter-mounting zones 19–20–21'. Grounding brackets 35 are omitted, and mounting blocks are secured at 55, as in the situation discussed for FIGS. 3, 4 and 6. Thus, at zone 19, the live jaw of mounting block 39 is strap connected to bar 10, the A line, and the live jaw of mounting block 40 is strap connected to bar 11, the B line; zone 19 therefore meters a single-phase branch of the A–B phase at its load terminals 49–49'. In similar fashion, the live jaws at zone 20 are strapped to bars 10–12, respectively, for metering of a load branch from the A–C phase; and the live jaws at zone 20' are strapped to bars 11–12, respectively, for metering of a load branch from the B–C phase.

FIG. 10 is in many respects similar to FIG. 9, except that the branching at zones 19–20–20' is in separate grounded phases of the grounded three-phase supply line 76, having the grounded neutral N in addition to the three live lines A–B–C. To accommodate the ground on a bus bar 76, the mounting blocks 30'–31' are provided with additional length, as will be clear. The mounting blocks may again be secured at 55, and ground brackets (not shown) may be provided for bus bar 76, depending upon whether the neutral is to be insulated or grounded, i.e., tied to the box metal. Thus, at zone 19, the live jaw of mounting block 39 is strap connected to bar 76, the N-line, and the live jaw of mounting block 40 is strap connected to bar 10, the A-line; zone 19 thus meters, at its load terminals 49–49', a branched supply of the A-phase. In similar fashion, the live jaws at zone 20 are strapped to bars 76–11, respectively, for metering of a branched supply of the B-phase; and the live jaws at zone 20' are strapped to bars 76–12, respectively, for metering of a branched supply of the C-phase.

The described prebussed meter box construction is seen to achieve the stated objects with basic simplicity such that a large variety of different branching and metering connections is readily achieved, with minimum and minor adapting connections. The arrangement permits "hiding" the bus bars behind the meter-mounting blocks 39–40, leaving the space above and below the blocks free and unobstructed for wires coming from top or bottom. Both ends of all bus bars extend into the wiring compartments and are provided with means for mounting connectors for incoming line conductors, thus permitting line connections at either end zone, depending on installation requirements. The provision of knockouts or other openings, as described, enables the supply line to enter from above or below, and the same is true as to the direction of the respective branch load lines; in all cases, wire connections enter straight into the connectors, almost without bending. By standardizing on two-meter boxes and three-meter boxes, the manufacturer or the public power utility need only stock two, rather than the previous larger number of sizes, in order to accommodate any number of meter positions; and because the connector alignments have like offsets which are centered on the end zone knockouts, it is relatively simple to run wires vertically through one wiring compartment of one box and into the wiring compartment of another meter socket box, as in FIGS. 7 and 8.

While the invention has been described in detail for various adaptations of a preferred form, it will be understood that modifications may be made without departing from the invention.

What is claimed is:

1. Prebussed multiple-position meter socket means, comprising an elongated housing box having a flat base for vertically mounted orientation and extending in common between two spaced live supply wiring zones with plural meter-mounting zones between said wiring zones, insulating bus-mounting means on said base, three elongated bus bars carried by said bus-mounting means in laterally spaced parallel relation, at least two of said bus bars being live, insulating meter-mounting block means carried by the central bus bar and extending transversely to and overlapping all said bus bars in each of said meter-mounting zones, each of said block means having a pair of longitudinally spaced live jaws in the region which overlaps one of the outer bus bars, each of said block means further having a pair of longitudinally spaced load jaws in the region which overlaps the other of the outer bus bars, said live and load jaws for each meter-mounting means being adapted to provide primary support for the stabs of a standard meter, a first live connection from one of said live bus bars to one of said live jaws, a second live connection from another of said bus bars to the other live jaw, and separate load connection means associated with said respective load jaws.

2. Meter socket means according to claim 1, in which the number of said bus bars is three, in which said meter-mounting blocks are each carried by the central bus bar, and in which said live connections to said live jaws are from the respective outer bus bars.

3. Meter socket means according to claim 2, in which said central bus bar includes a conductive mounting connection to said housing.

4. Meter socket means according to claim 2, in which said flat base is of metal, and in which a grounding connection ties said central bus bar to said metal base.

5. Meter socket means according to claim 1, in which each of said bus bars includes, in the live supply wiring zone at each end thereof, separate means for connection of a live line element; said last-defined means being in longitudinally staggered offset relation for connection of live line elements to the respective bus bars.

6. Meter socket means according to claim 5, wherein said housing box includes elongated sides contiguous to and upstanding from said base, said sides including transversely aligned knockouts or openings respectively aligned with said last-defined means.

7. Meter socket means according to claim 1, in which the number of said bus bars is three, in which said live connections to said live jaws are from the respective outer bars, and in which said third bus bar includes load wire connecting means, whereby plural three-wire load branches may be served by connection of a three-wire supply to said bars at one of said live supply wiring zones.

8. Meter socket means according to claim 7, in which said meter-mounting blocks are each carried by the central one of three bus bars.

9. Meter socket means according to claim 1, in which said live connections to live jaws are respectively made to the same bus bars at each of a plurality of said meter-mounting zones.

10. Meter socket means according to claim 1, in which the plurality of live bus bars is at least three, and in which said live connections in one meter-mounting zone are respectively made to a different pair of said live bars than in another meter-mounting zone.

11. Meter socket means according to claim 1, in which said bus bars include two live bars and one neutral bar, said live connections in one meter-mounting zone being made respectively to said neutral bar and to one of said live bars, and said live connections in another meter-mounting zone being made respectively to said neutral bar and to the other of said live bars.

12. Meter socket means according to claim 1, in which said bus bars include three live bars, said live connections in one meter-mounting zone being made respectively to first and second of said bars, and said live connections in another meter-mounting zone being made respectively to said second and said third bar.

13. Meter socket means according to claim 1, in which said bus bars include three live bars and one neutral bar, said connections in one meter-mounting zone being made respectively to a first live bar and to said neutral bar, said live connections in another meter-mounting zone being made respectively to a second live bar and to said neutral bar, and said live connections in a third meter-mounting zone being made respectively to the third live bar and to said neutral bar.

14. Meter socket means according to claim 1, wherein said insulating bus-mounting means is provided at each of said wiring zones and said bus bars are carried at their respective ends by said mounting means.

15. Meter socket means according to claim 1, in which each of said block means comprises two separate spaced blocks, each of which extends transversely to and overlaps all said bus bars, each block having one of the live jaws and one of the load jaws.

16. Meter socket means according to claim 1, in which said bus-mounting means comprises longitudinally spaced insulating blocks extending transversely to and secured to all said bus bars.

* * * * *